US012318876B2

(12) United States Patent
Morimoto et al.

(10) Patent No.: US 12,318,876 B2
(45) Date of Patent: Jun. 3, 2025

(54) SCREW MEMBER TIGHTENING AND LOOSENING APPARATUS, AND SCREW MEMBER TIGHTENING AND LOOSENING METHOD

(71) Applicant: Daifuku Co., Ltd., Osaka (JP)

(72) Inventors: Hirohisa Morimoto, Tokyo (JP); Hiroki Omoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 8 days.

(21) Appl. No.: 18/267,256

(22) PCT Filed: Nov. 30, 2021

(86) PCT No.: PCT/JP2021/043875
§ 371 (c)(1),
(2) Date: Jun. 14, 2023

(87) PCT Pub. No.: WO2022/130965
PCT Pub. Date: Jun. 23, 2022

(65) Prior Publication Data
US 2024/0042560 A1    Feb. 8, 2024

(30) Foreign Application Priority Data
Dec. 15, 2020    (JP) .................................. 2020-207663

(51) Int. Cl.
*B23P 19/06*    (2006.01)
*B23P 19/10*    (2006.01)
(Continued)

(52) U.S. Cl.
CPC .............. *B23P 19/06* (2013.01); *B23P 19/10* (2013.01); *B25B 23/14* (2013.01); *B25J 11/00* (2013.01)

(58) Field of Classification Search
CPC .......... B23P 19/06; B23P 19/10; B25B 23/14; B25J 11/00
See application file for complete search history.

(56) References Cited

U.S. PATENT DOCUMENTS

| | | | |
|---|---|---|---|
| 4,813,312 A | * | 3/1989 | Wilhelm ............... B25B 23/147 81/469 |
| 10,996,649 B2 | * | 5/2021 | Abdallah ............. G05B 19/402 |

(Continued)

FOREIGN PATENT DOCUMENTS

| | | | | |
|---|---|---|---|---|
| CN | 102209611 A | * | 10/2011 | ............. B25B 23/14 |
| CN | 108747330 A | * | 11/2018 | ............ B23P 19/004 |

(Continued)

*Primary Examiner* — Robert F Long
*Assistant Examiner* — Eduardo R Ferrero
(74) *Attorney, Agent, or Firm* — The Webb Law Firm

(57) ABSTRACT

A control unit is configured to performs a first control of controlling a movement unit so that a fitted part of a screw member and a fitting part of a rotating body are axially aligned with each other; a second control of controlling the movement unit to press the fitting part against the fitted part; a third control of, while maintaining a state in which the fitting part is pressed against the fitted part, controlling a rotation-driving unit to rotate the rotating body to a first rotation direction side by a first predetermined angle; a fourth control of, while maintaining the state in which the fitting part is pressed against the fitted part, controlling the rotation-driving unit to rotate the rotating body to a second rotation direction side by a second predetermined angle, which is smaller than the first predetermined angle, the fourth control performed after the third control.

6 Claims, 9 Drawing Sheets

(51) Int. Cl.
*B25B 23/14* (2006.01)
*B25J 11/00* (2006.01)

(56) References Cited

U.S. PATENT DOCUMENTS

| | | | |
|---|---|---|---|
| 11,931,896 B2 * | 3/2024 | Kim | B25J 9/1633 |
| 2001/0054223 A1 * | 12/2001 | Yamanashi | B23Q 1/66 |
| | | | 414/754 |
| 2010/0242690 A1 * | 9/2010 | Tohyama | B23P 19/06 |
| | | | 81/451 |
| 2015/0047471 A1 * | 2/2015 | Yoshinaga | B23P 19/06 |
| | | | 901/41 |
| 2016/0089789 A1 * | 3/2016 | Sato | B25J 13/088 |
| | | | 700/254 |
| 2017/0326695 A1 * | 11/2017 | Danebergs | B23P 19/06 |
| 2020/0353618 A1 * | 11/2020 | Kim | B25J 9/0096 |
| 2021/0299804 A1 * | 9/2021 | Arimitsu | B23P 19/06 |

FOREIGN PATENT DOCUMENTS

| | | | | |
|---|---|---|---|---|
| JP | H07136870 | A | * | 5/1995 |
| JP | H1080828 | A | * | 3/1998 |
| JP | 2000052164 | A | * | 2/2000 |
| JP | 2004237444 | A | | 8/2004 |
| JP | 2007326171 | A | * | 12/2007 |
| JP | 2008142824 | A | * | 6/2008 |
| JP | 2008296291 | A | * | 12/2008 |
| JP | 2015093352 | A | * | 5/2015 |
| WO | WO-2022067710 | A1 | * | 4/2022 ............. B25B 27/04 |

* cited by examiner

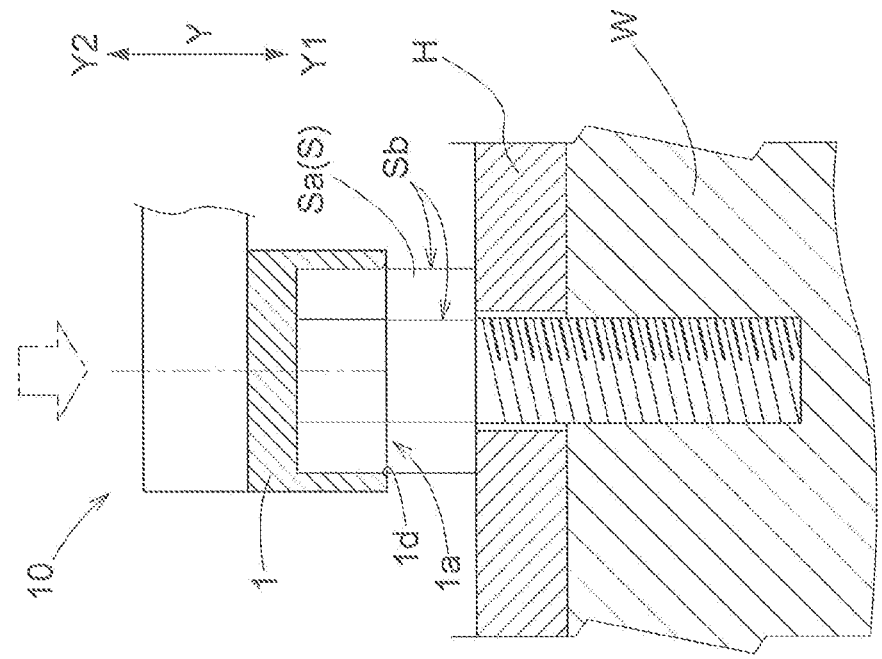
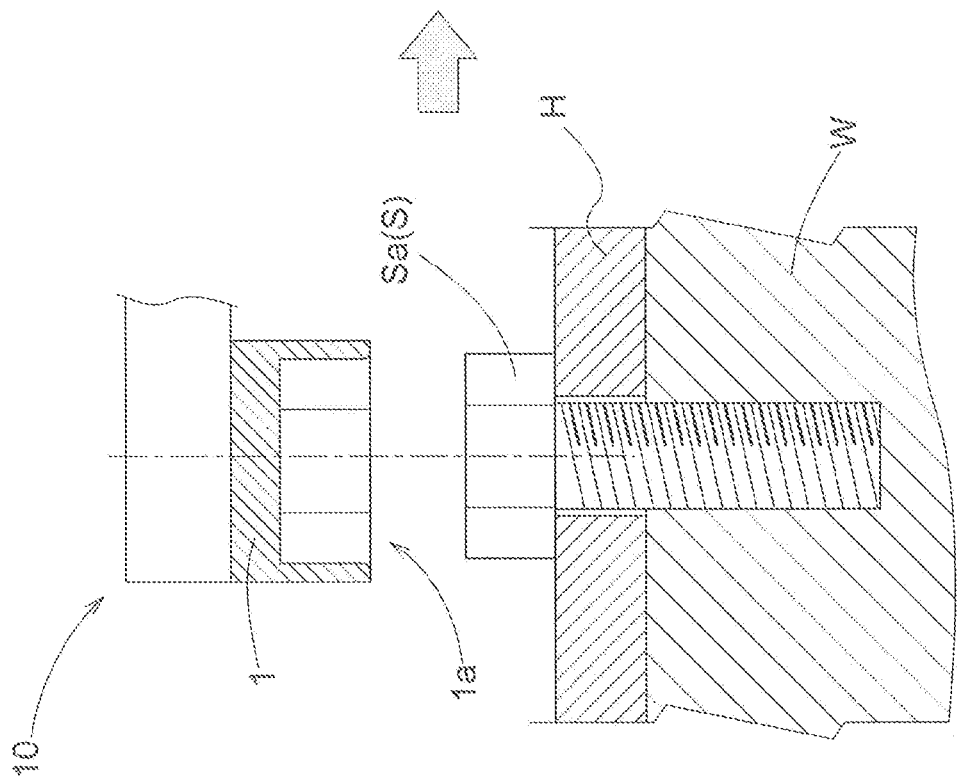
Fig.6

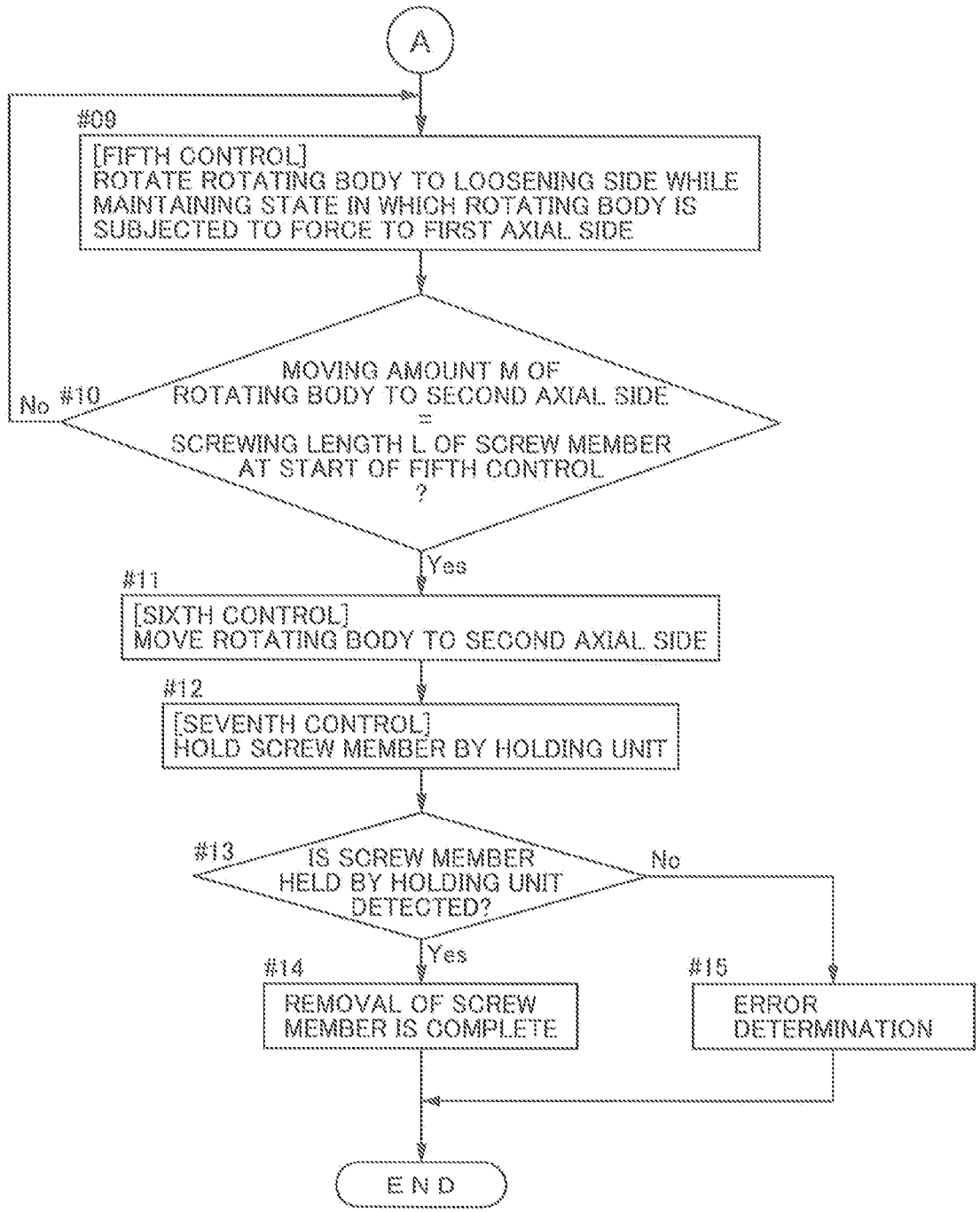

SCREW MEMBER TIGHTENING AND LOOSENING APPARATUS, AND SCREW MEMBER TIGHTENING AND LOOSENING METHOD

CROSS-REFERENCE TO RELATED APPLICATIONS

This application is the United States national phase of International Application No. PCT/JP2021/043875 filed Nov. 30, 2021, and claims priority to Japanese Patent Application No. 2020-207663 filed Dec. 15, 2020, the disclosures of which are hereby incorporated by reference in their entireties.

BACKGROUND OF THE INVENTION

Field of the Invention

The present invention relates to a screw member tightening and loosening apparatus including: a rotating body having a fitting part configured to fit to a fitted part of a screw member; a rotation-driving unit configured to rotate the rotating body; and a movement unit configured to move the rotating body, and also relates to a screw member tightening and loosening method.

Description of Related Art

An example of such a technique is disclosed in JP 2004-237444A Publication (Patent Document 1). Hereinafter, in the description of Background Art, the reference signs in Patent Document 1 are put in parentheses.

Patent Document 1 disclose a screw member tightening and loosening apparatus provided with a nut runner (40) attached to a distal end of a robot arm (30), the nut runner (40) including a rotating body (40c) having a fitting part (40d) configured to fit to a fitted part (lid) of a screw member (11). With the screw member tightening and loosening apparatus having such a configuration, by fitting the fitting part (40d) of the rotating body (40c) of the nut runner (40) to the fitted part (11d) of the screw member (11), and then rotating the rotating body (40c), it is possible to tighten and loosen the screw member (11) with respect to a screwing target (10).

Patent Document

Patent Document 1: JP 2004-237444A Publication.

In the above-described screw member tightening and loosening apparatus, as control when fitting the fitting part (40d) of the rotating body (40c) of the nut runner (40) to the fitted part (lid) of the screw member (11), first, the nut runner (40) is moved using the robot arm (30) so that the fitted part (lid) of the screw member (11) and the fitting part (40d) of the rotating body (40c) are axially aligned with each other. Then, the nut runner (40) is subjected to a force to the screw member (11) using the robot arm (30) so that the fitting part (40d) is pressed against the fitted part (lid). Then, by rotating the rotating body (40c) of the nut runner (40) at a low speed while maintaining the state, the fitting part (40d) of the rotating body is fitted to the fitted part (lid) of the screw member (11) (see Paragraph 0028 in Patent Document 1).

However, in the above-described control, the rotation of the rotating body (40c) brings the fitting surfaces of the fitted part (11d) and the fitting part (40d) into contact with each other with a high pressure, and there may be a case where it is not possible to move the rotating body (40c) toward the screw member (11). As a result, there is the problem that sometimes the fitting part (40d) of the rotating body (40c) and the fitted part (lid) of the screw member (11) cannot suitably be fitted to each other.

SUMMARY OF THE INVENTION

Therefore, in view of the foregoing, it is desirable to realize a technique according to which it is possible to suitably fit a fitting part of a rotating body to a fitted part of a screw member.

In view of the above-described circumstances, a feature configuration of a screw member tightening and loosening apparatus is such that it includes:

a rotating body that has a fitting part configured to fit to a fitted part of a screw member, and is supported so as to be rotatable about an axis of the fitting part;

a rotation-driving unit configured to rotate the rotating body;

a movement unit configured to move the rotating body; and a control unit configured to control operations of the rotation-driving unit and the movement unit, wherein letting one side in a rotational direction of rotation of the rotating body caused by the rotation-driving unit be a first rotation direction, and the other side be a second rotation direction, the control unit is configured to perform:

a first control of controlling the movement unit so that the fitted part and the fitting part are axially aligned with each other;

a second control of, while maintaining a state in which the fitted part and the fitting part are axially aligned with each other, controlling the movement unit to press the fitting part against the fitted part;

a third control of, while maintaining a state in which the fitting part is pressed against the fitted part, controlling the rotation-driving unit to rotate the rotating body to the first rotation direction by a first predetermined angle; and a fourth control of, while maintaining the state in which the fitting part is pressed against the fitted part, controlling the rotation-driving unit to rotate the rotating body to the second rotation direction by a second predetermined angle, which is smaller than the first predetermined angle, the fourth control performed after the third control, the fitting part is shaped such that a predetermined shape repeatedly appears at every predetermined angle in the rotational direction, and the first predetermined angle is set to an angle that corresponds to the predetermined angle.

According to this feature configuration, after the first control of controlling the movement unit so that the fitted part of the screw member and the fitting part of the rotating body are axially aligned with each other, the second control of controlling the movement unit to press the fitting part against the fitted part, and the third control of controlling the rotation-driving unit to rotate the rotating body to the first rotation direction by the first predetermined angle, the fourth control of, while maintaining the state in which the fitting part is pressed against the fitted part, controlling the rotation-driving unit to rotate the rotating body to the second rotation direction by the second predetermined angle is performed. With this, even if, during the third control, the fitting surfaces of the fitted part of the screw member and the fitting part of the rotating body are in contact with each other with a high pressure, it is possible, in the fourth control, to rotate the rotating body so that these fitting surfaces are separated from each other, and move the rotating body toward the screw member. As a result, it is possible to appropriately fit the fitting part of the rotating body to the fitted part of the screw member.

Also, in view of the above-described circumstances, a feature configuration of a screw member tightening and loosening method for tightening and loosening a screw member using a rotating body that has a fitting part configured to fit to a fitted part of the screw member, and is supported so as to be rotatable about an axis of the fitting part is such that the fitting part being shaped such that a predetermined shape repeatedly appears at every predetermined angle in a rotational direction of the rotating body, and letting one side in the rotational direction be a first rotation direction, and the other side be a second rotation direction, the method includes:

a first step of moving the rotating body so that the fitted part and the fitting part are axially aligned with each other;

a second step of, while maintaining a state in which the fitted part and the fitting part are axially aligned with each other, moving the rotating body to press the fitting part against the fitted part;

a third step of, while maintaining a state in which the fitting part is pressed against the fitted part, rotating the rotating body to the first rotation direction by a first predetermined angle that is set to an angle corresponding to the predetermined angle; and a fourth step of, while maintaining the state in which the fitting part is pressed against the fitted part, rotating the rotating body to the second rotation direction by a second predetermined angle, which is smaller than the first predetermined angle, the fourth step performed after the third step.

According to this feature configuration, after the first step of moving the rotating body so that the fitted part of the screw member and the fitting part of the rotating body are axially aligned with each other, the second step of moving the rotating body to press the fitting part against the fitted part, and the third step of rotating the rotating body to the first rotation direction by the first predetermined angle, the fourth step of, while maintaining the state in which the fitting part is pressed against the fitted part, rotating the rotating body to the second rotation direction by the second predetermined angle is performed. With this, even if, during the third step, the fitting surfaces of the fitted part of the screw member and the fitting part of the rotating body are in contact with each other with a high pressure, it is possible, in the fourth step, to rotate the rotating body so that these fitting surfaces are separated from each other, and move the rotating body toward the screw member. As a result, it is possible to appropriately fit the fitting part of the rotating body to the fitted part of the screw member.

BRIEF DESCRIPTION OF THE DRAWINGS

FIG. 6 illustrates examples of a first control and a second control.

FIG. 10 is a flowchart illustrating the example of the control performed when the screw member is removed from the screwing target.

DESCRIPTION OF THE INVENTION

Figure 1:
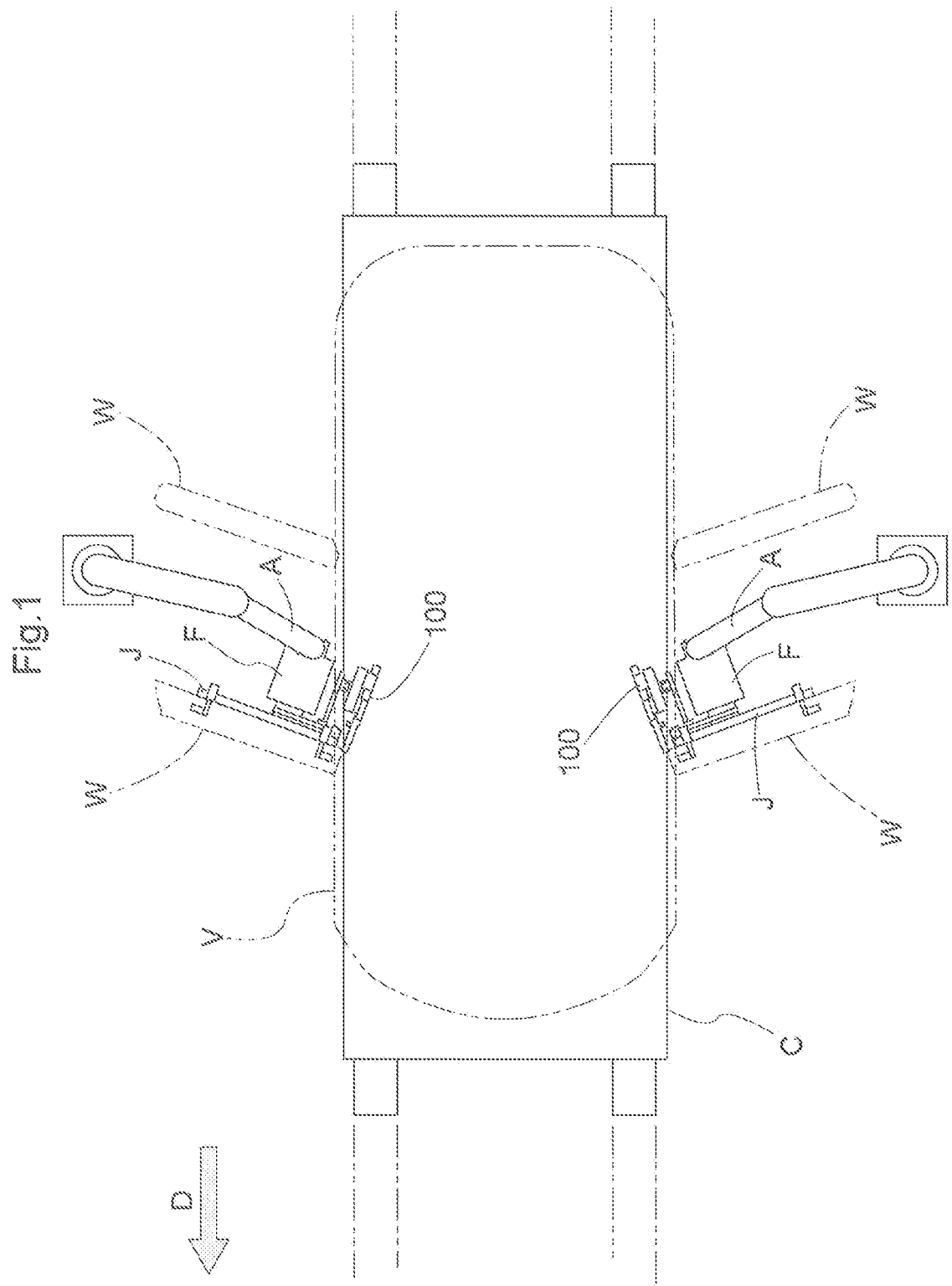
FIG. 1 is a plan view illustrating a facility in which a screw member tightening and loosening apparatus according to an embodiment is used.
Figure 2:
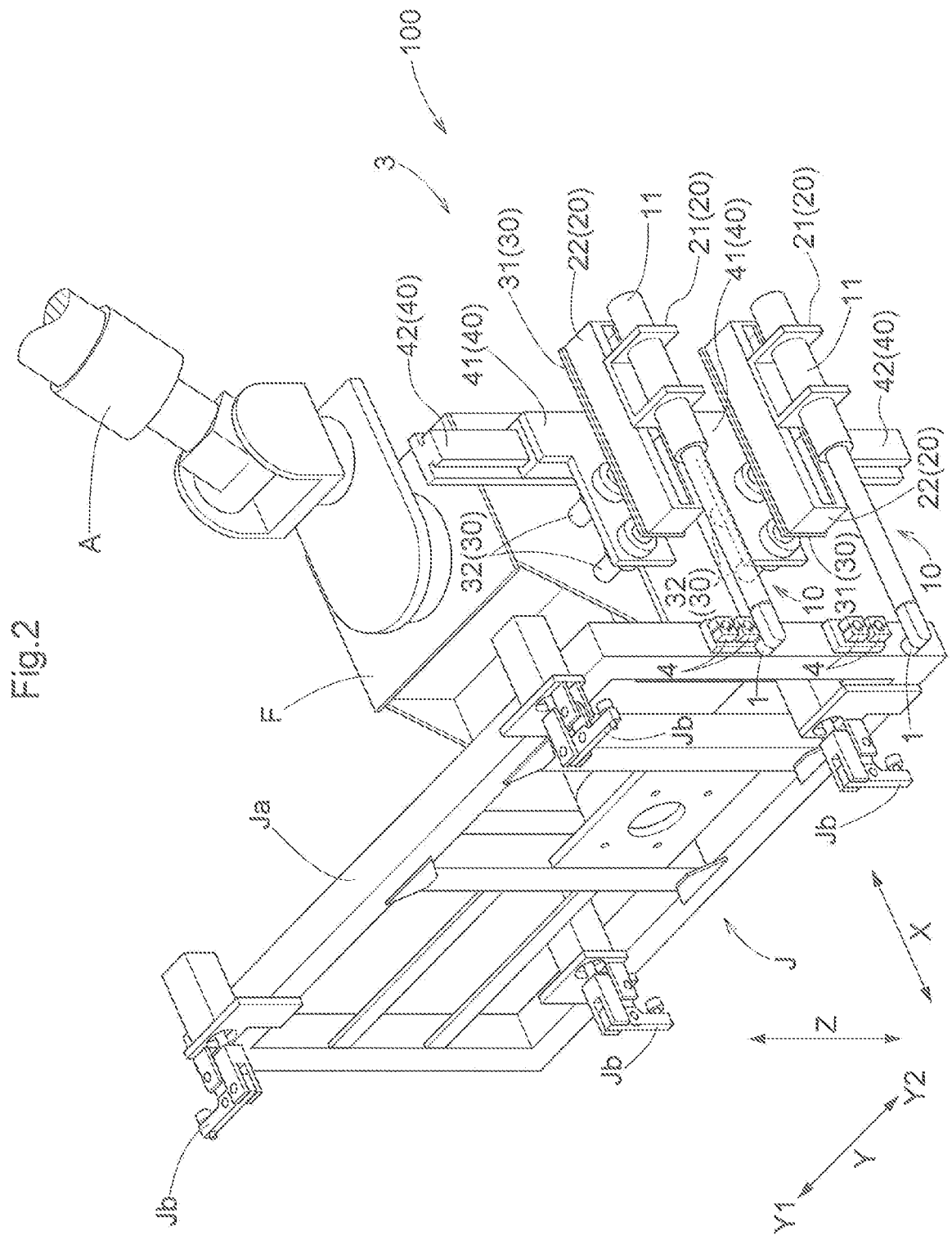
FIG. 2 is a perspective view illustrating a state in which the screw member tightening and loosening apparatus according to the embodiment and a jig are supported on a floating unit attached to a robot arm.

The following describes a screw member tightening and loosening apparatus 100 according to an embodiment with reference to the drawings. The screw member tightening and loosening apparatus 100 is an apparatus for tightening or loosening a screw member S with respect to a screwing target W. As shown in FIGS. 1 and 2, in the present embodiment, the screw member tightening and loosening apparatus 100 is supported on a floating unit F attached to a distal end portion of a robot arm A. A jig J for supporting the screwing target W is also supported on the floating unit F. In the present embodiment, the screw member tightening and loosening apparatus 100 operates to remove the screw member S (see FIG. 3) from the screwing target W supported by the jig J.

As shown in FIG. 1, in the present embodiment, the screwing target W is a door unit of a vehicle V conveyed by a conveyance device C in a conveyance direction D. In the shown example, robot arms A are respectively arranged on both lateral sides of a path in which the vehicle V is conveyed.

There are multiple types of jigs J corresponding to types of screwing targets W, and replacement is made according to the type of screwing target W, which is a work object. As shown in FIG. 2, the jig J includes a frame Ja in the shape of a frame, and a plurality of fixing parts Jb supported on the frame Ja. The plurality of fixing parts Jb are configured to fix the screwing target W with the screwing target W abutting against the frame Ja. Each of the plurality of fixing parts Jb is designed to be switchable between a fixed state in which the jig J is fixed and a fixation canceling state in which the fixation of the jig J is cancelled. The number of fixing parts Jb for each jig J, and their positions and the like depend on the type of screwing target W.

The floating unit F is designed to support the screw member tightening and loosening apparatus 100 and the jig J as one piece so that they can relatively move and relatively rotate with respect to the floating unit F. Therefore, while the screw member tightening and loosening apparatus 100 and the jig J are supported on the floating unit F, the relative positions of the screw member tightening and loosening apparatus 100 and the jig J are always fixed.

In the following description, in the screw member tightening and loosening apparatus 100 and the jig J supported on the floating unit F, three directions orthogonal to each other are respectively defined as a "first direction X", a "second direction Y", and a "third direction Z". In the present embodiment, the second direction Y matches an axial direction of the screw member S screwed with the screwing target W supported by the jig J, that is, a screwing direction of the screw member S with the screwing target W.

Figure 3:
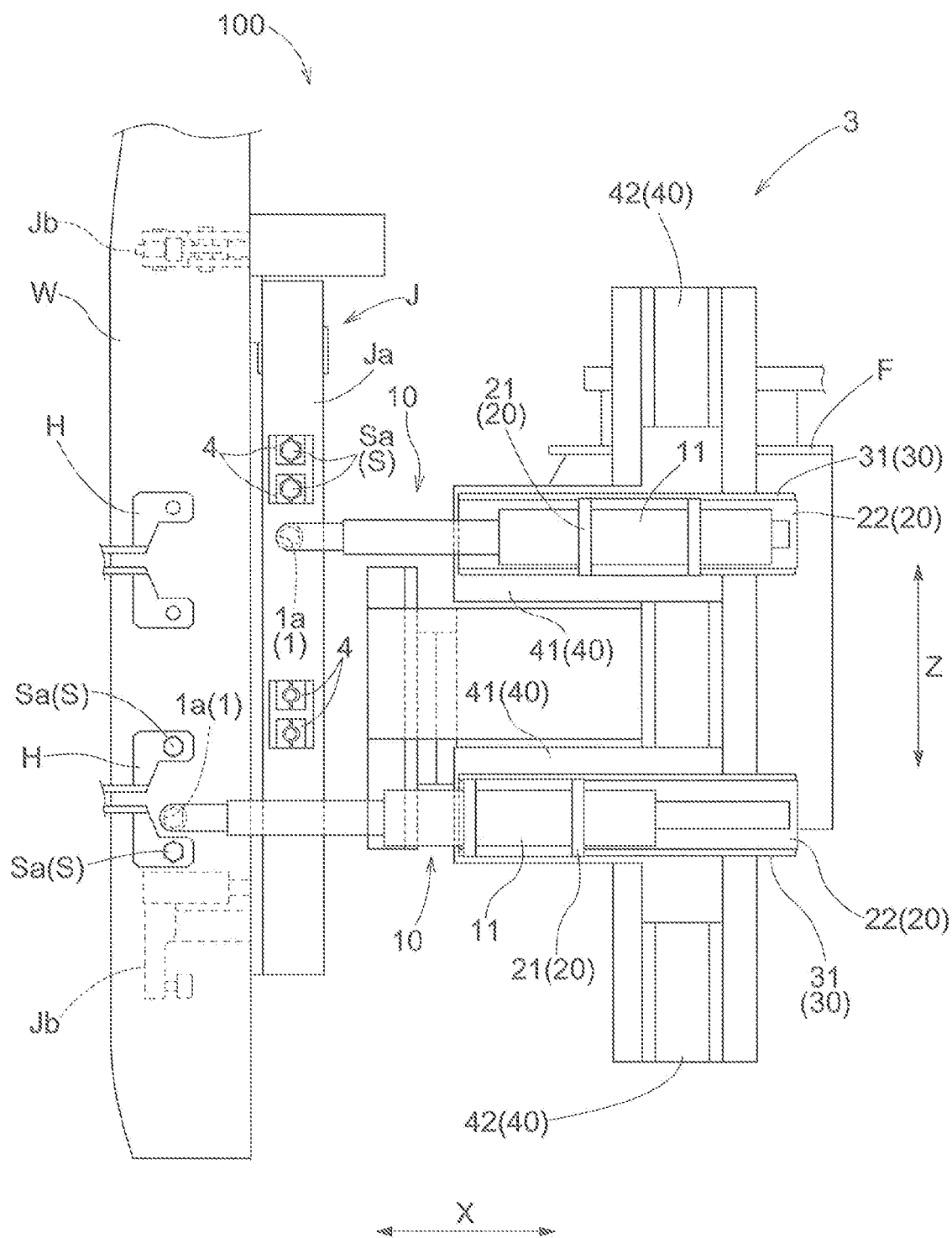
FIG. 3 is a diagram illustrating the screw member tightening and loosening apparatus according to the embodiment, and the jig that supports a screwing target, viewed in a direction along an axis of a fitting part of a rotating body.

As shown in FIG. 2, in the present embodiment, the jig J is arranged on one side of the floating unit F in the first direction X. Also, as shown in FIG. 3, the jig J supports the screwing target W while abutting against the screwing target W in the first direction X. In the present embodiment, in the state in which the screwing target W is supported by the jig J, a pair of screw members S are screwed via a hinge H at an end of the screwing target W in the second direction Y. In the example shown in FIG. 3, a pair of screw members S are aligned in the third direction Z and are screwed at each of two positions of the screwing target W aligned in the third direction Z.

As shown in FIGS. 2 and 3, in the present embodiment, the screw member tightening and loosening apparatus 100 is arranged on a side of the floating unit F in the second direction Y on which the screw members S screwed to the screwing target W are located. In the present embodiment, the screw member tightening and loosening apparatus 100 includes a pair of nut runners 10, a pair of first moving mechanisms 20, a pair of second moving mechanisms 30, and a pair of third moving mechanisms 40.

In the present embodiment, one of the nut runners 10, one of the first moving mechanisms 20, one of the second moving mechanisms 30, and one of the third moving mechanisms 40, and the other nut runner 10, the other first moving mechanism 20, the other second moving mechanism 30, and the other third moving mechanism 40 are aligned in the third direction Z. Note that the one nut runner 10, the one first moving mechanism 20, the one second moving mechanism 30, and the one third moving mechanism 40, and the other nut runner 10, the other first moving mechanism 20, the other second moving mechanism 30, and the other third moving mechanism 40 respectively have the same configurations, and thus, unless otherwise noted, descriptions of the other nut runner 10, the other first moving mechanism 20, the other second moving mechanism 30, and the other third moving mechanism 40 are omitted.

Figure 5:
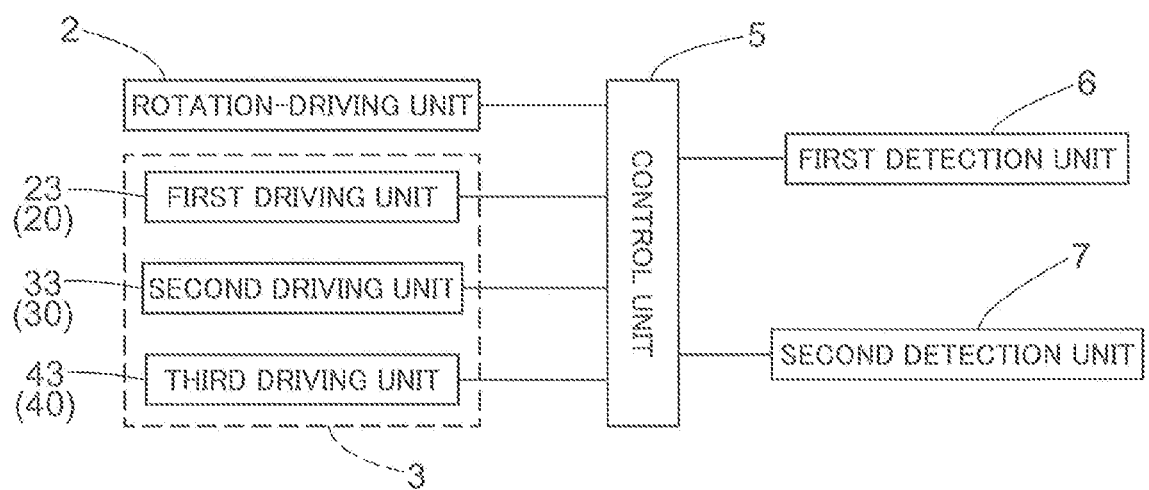
FIG. 5 is a control block diagram of the screw member tightening and loosening apparatus according to the embodiment.

The nut runner 10 includes a rotating body 1 and a rotation-driving unit 2 (see FIG. 5). As shown in FIG. 3, the rotating body 1 includes a fitting part 1a fitted to the fitted part Sa of the screw member S. Also, the rotating body 1 is supported so as to be rotatable about the axis of the fitting part 1a. The rotation-driving unit 2 is configured to rotate the rotating body 1. The rotation-driving unit 2 includes, for example, a motor, and a transmission mechanism for transmitting rotation of the motor to the rotating body 1. In the present embodiment, the rotation-driving unit 2 is housed in a case 11. Also, the rotating body 1 is supported by the case 11 so as to be rotatable.

In the present embodiment, the rotating body 1 is arranged so that the axis of the fitting part 1a extends in the second direction Y in a state in which the screwing target W is supported by the jig J. That is to say, in the present embodiment, the second direction Y corresponds to an "axial direction" that is a direction extending along the axis of the fitting part 1a.

In the following description, in a state in which the screwing target W is supported by the jig J, a side in the second direction Y to which the fitting part 1a of the rotating body 1 approaches the fitted part Sa of the screw member S is defined as a "first axial side Y1", and a side in the second direction Y to which the fitting part 1a of the rotating body 1 is separated from the fitted part Sa of the screw member S is defined as a "second axial side Y2". Also, the direction of rotation of the rotating body 1 is defined as a "rotational direction R".

As shown in FIGS. 2 and 3, the first moving mechanism 20 includes a first support part 21 supporting the nut runner 10, a first guide part 22 for guiding the first support part 21 in the first direction X, and a first driving unit 23 (see FIG. 5) for moving the first support part 21 in the first direction X.

In the present embodiment, the first support part 21 supports the case 11 of the nut runner 10. In the present embodiment, the case 11 is tubular with its axis extending in the first direction X. Also, the rotating body 1 is arranged at one end of the case 11 in the first direction X.

The first guide part 22 supports the first support part 21 so that it can move in the first direction X. As the first guide part 22, for example, a direct acting mechanism can be used that includes a rail extending in the first direction X and a mobile object that moves along the rail. Also, as the first driving unit 23, for example, an electric cylinder can be used that includes a motor, and a conversion mechanism that converts rotary motion of the motor into linear motion in the first direction X. Note that a fluid pressure cylinder may also be used as the first driving unit 23. Examples of a fluid pressure cylinder that can be used include a pneumatic cylinder and a hydraulic cylinder.

The second moving mechanism 30 includes a second support part 31 supporting the first guide part 22, a second guide part 32 for guiding the second support part 31 in the second direction Y, and a second driving unit 33 (see FIG. 5) for moving the second support part 31 in the second direction Y.

In the present embodiment, the second support part 31 is plate-shaped while extending in the first direction X and the third direction Z. Also, the second support part 31 supports the first guide part 22 from the first axial side Y1. The second guide part 32 supports the second support part 31 so that it can move in the second direction Y. In the present embodiment, one pair of second guide parts 32 extending in the second direction Y are aligned in the first direction X. As the second guide parts 32, for example, a direct acting mechanism can be used that includes an axial member extending in the second direction Y and a mobile object that moves along the axial member. Also, as the second driving unit 33, for example, a fluid pressure cylinder coupled to the second support part 31 can be used. Examples of a fluid pressure cylinder that can be used include a pneumatic cylinder and a hydraulic cylinder. Note that an electric cylinder may also be used as the second driving unit 33.

The third moving mechanism 40 includes a third support part 41 supporting the second guide part 32, a third guide part 42 for guiding the third support part 41 in the third direction Z, and a third driving unit 43 (see FIG. 5) for moving the third support part 41 in the third direction Z.

In the present embodiment, the third support part 41 is plate-shaped while extending in the first direction X and the third direction Z. Also, the third support part 41 is arranged opposing the second support part 31 from the first axial side Y1. The third guide part 42 supports the third support part 41 so that it can move in the third direction Z. As the third guide part 42, for example, a direct acting mechanism can be used that includes a rail extending in the third direction Z and a mobile object that moves along the rail. Also, as the third driving unit 43, for example, an electric cylinder can be used that includes a motor, and a conversion mechanism that converts rotary motion of the motor into linear motion in the third direction Z. Note that a fluid pressure cylinder may also be used as the third driving unit 43. Examples of a fluid pressure cylinder that can be used include a pneumatic cylinder and a hydraulic cylinder.

In this way, in the screw member tightening and loosening apparatus 100 of the present embodiment, the nut runner 10 is moved in the first direction X by the first moving mechanism 20, is moved in the second direction Y by the second moving mechanism 30, and is moved in the third direction Z by the third moving mechanism 40. That is, in the present embodiment, the first moving mechanism 20, the second moving mechanism 30, and the third moving mechanism 40 function as a "movement unit 3" for moving the rotating body 1. Thus, the screw member tightening and loosening apparatus 100 includes the rotating body 1, the rotation-driving unit 2, and the movement unit 3.

As shown in FIGS. 2 and 3, in the present embodiment, the screw member tightening and loosening apparatus 100 includes a holding unit 4 for holding screw members S. In the present embodiment, the holding unit 4 holds the screw members S in a manner such that the axis of each screw member S extends in the second direction Y. Also, in the present embodiment, a pair of holding units 4 are arranged while being aligned in the third direction Z, at each of two positions, aligned in the third direction Z, of a side surface of the jig J facing the second axial side Y2.

Figure 4:
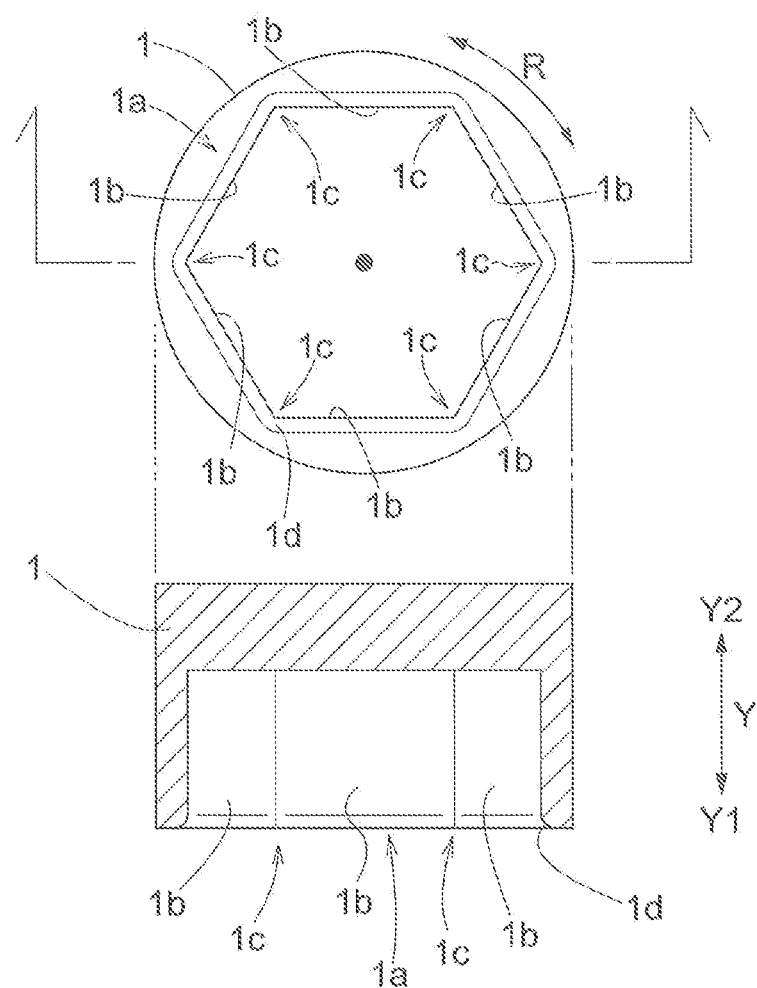
FIG. 4 illustrates the rotating body in a diagram viewed in a direction along the axis of the fitting part, and in a cross-sectional view taken along the axis of the rotating body.

As shown in FIG. 3, in the present embodiment, the screw member S is a hexagon bolt with a hexagonal columnar head. Therefore, in the present embodiment, the fitted part Sa of the screw member S is a hexagonal columnar head. Accordingly, as shown in FIG. 4, in the present embodiment, the rotating body 1 is a socket formed such that a hexagonal columnar recess, serving as the fitting part 1a, is open to the first axial side Y1. Therefore, the fitting part 1a has the shape of a polygonal tube with a plurality of (here, six) side surfaces 1b surrounding the axis of the fitting part 1a.

In this way, in the present embodiment, the fitted part Sa of the screw member S is shaped such that a predetermined shape repeatedly appears at every predetermined angle in the rotational direction R of the screw member S. This means that the shape of the fitted part Sa is such that it can be divided into a number of predetermined shapes, and these predetermined shapes repeat about the fitted part Sa in the rotational direction R. When an amount of rotation occurs that is equal to the predetermined angle, a new predetermined shape begins. Also, the fitting part 1a of the rotating body 1 is shaped such that a predetermined shape repeatedly appears at every predetermined angle in the rotational direction R of the rotating body 1 so as to conform to the shape of the fitted part Sa. Thus, in the present embodiment, the fitting part 1a is configured to fit to the fitted part Sa when the phase of the predetermined shape of the fitting part 1a that repeats at every predetermined angle matches the phase of the corresponding shape of the fitted part Sa.

Also, in the present embodiment, a boundary portion 1c between adjacent side surfaces 1b of the plurality of side surfaces 1b has, at an end on the first axial side Y1, a chamfered portion 1d that is inclined with respect to the second direction Y. In the present example, the chamfered portions 1d are continuously formed over the entire region, in the rotational direction R, of the end of the fitting part 1a on the first axial side Y1. Also, in the present embodiment, the chamfered portions 1d are inclined so as to be gradually directed to the second axial side Y2 while approaching the axis of the fitting part 1a from the outer side in the radial direction.

As shown in FIG. 5, the screw member tightening and loosening apparatus 100 includes a control unit 5 for controlling operations of the rotation-driving unit 2 and the movement unit 3. In the present embodiment, the control unit 5 controls the first driving unit 23 of the first moving mechanism 20, the second driving unit 33 of the second moving mechanism 30, and the third driving unit 43 of the third moving mechanism 40.

In the present embodiment, the screw member tightening and loosening apparatus 100 includes a first detection unit 6 for detecting a state of the rotating body 1, and a second detection unit 7 for detecting whether or not the screw member S is held by the holding unit 4. The control unit 5 acquires a detection signal of the first detection unit 6, and a detection signal of the second detection unit 7.

In the present embodiment, the first detection unit 6 is configured to detect at least one of a rotation torque T of the rotating body 1 and a moving amount M of the rotating body 1 in the second direction Y. In the present example, the first detection unit 6 includes both a first sensor such as a torque sensor for detecting the rotation torque T of the rotating body 1, and a second sensor such as an encoder for detecting the moving amount M of the rotating body 1 in the second direction Y. That is to say, in the present example, the first detection unit 6 is configured to detect both the rotation torque T of the rotating body 1 and the moving amount M of the rotating body 1 in the second direction Y.

The control unit 5 performs a first control, a second control, a third control, and a fourth control in the stated order.

As shown in a left-side figure in FIG. 6, in the first control, the control unit 5 controls the movement unit 3 so that the fitting part 1a of the rotating body 1 is axially aligned with the fitted part Sa of the screw member S. Here, as described above, in the present embodiment, the floating unit F supports the screw member tightening and loosening apparatus 100 and the jig J as one piece so that they can relatively move and relatively rotate with respect to the floating unit F. That is to say, the relative positional relationship between the screw member tightening and loosening apparatus 100, which includes the first moving mechanism 20, the second moving mechanism 30, and the third moving mechanism 40, and the jig J is always fixed. Therefore, while the screwing target W is supported by the jig J, also the relative positional relationship between the screw member tightening and loosening apparatus 100 and the screwing target W is always fixed. Therefore, it is possible to calculate in advance the relative position of the screw member S screwed to the screwing target W with respect to the rotating body 1.

As shown in a right-side figure in FIG. 6, in the second control, the control unit 5, while maintaining the state in which the fitting part 1a of the rotating body 1 is axially aligned with the fitted part Sa of the screw member S, controls the movement unit 3 to press the fitting part 1a against the fitted part Sa. It is here assumed that, in the second control, the phase of the fitting part 1a and the phase of the fitted part Sa do not match each other. Therefore, in the present embodiment, in the second control, the plurality of (here, six) angular portions Sb of the fitted part Sa of the screw member S abut against the chamfered portions 1d of the rotating body 1 from the first axial side Y1, thereby restricting the rotating body 1 from moving to the first axial side Y1.

Figure 7:
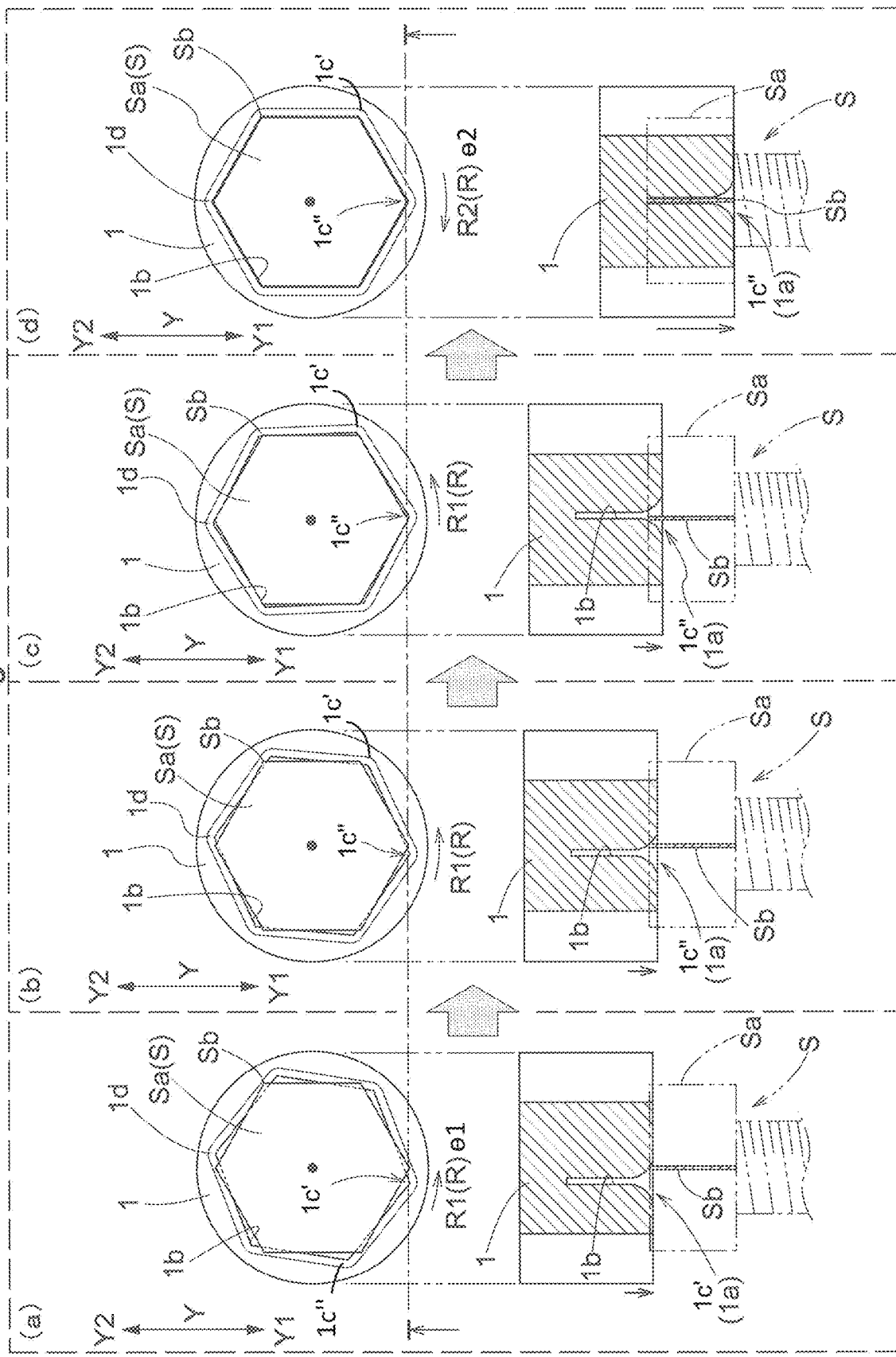
FIG. 7 illustrates examples of a third control and a fourth control.

As shown in figures (a) to (c) in FIG. 7, in the third control, the control unit 5 controls, while maintaining the state in which the fitting part 1a of the rotating body 1 is pressed against the fitted part Sa of the screw member S, the rotation-driving unit 2 to rotate the rotating body 1 to a first rotation direction R1 by a first predetermined angle θ1. Here, the first predetermined angle θ1 is set to an angle that corresponds to the predetermined angle, which is an angle interval at which the predetermined shape of the fitting part 1a of the rotating body 1 repeatedly appears in the rotational direction R. For example, in the present embodiment, where the fitting part 1a is a hexagonal column, the predetermined shape is defined by one sidewall of the fitting part 1a and two virtual lines that extend from the end of that sidewall to the center point of the predetermined shape. The angle interval at which the predetermined shape repeatedly appears is 60°. Accordingly, the first predetermined angle θ1 can be set to 60°. This rotation is shown in figures (a) and (b) in FIG. 7, where a first boundary portion 1c' is shown adjacent to an angular portion Sb of the screw member S in figure (a) in FIG. 7, and a second boundary portion 1c" is shown adjacent to the angular portion Sb in figure (b) in FIG. 7. Here, the first rotation direction R1 refers to one side in the rotational direction R of rotation of the rotating body 1 caused by the rotation-driving unit 2. Note that in contrast to the shown example, if the fitting part 1a is a dodecahedral socket obtained by laying two hexagonal columns one above the other, the angle interval at which the predetermined shape repeatedly appears is 30°. In this case, the first predetermined angle θ1 can be set to 30°, for example.

As shown in the figure (d) in FIG. 7, in the fourth control, the control unit 5, while maintaining the state in which the fitting part 1a of the rotating body 1 is pressed against the fitted part Sa of the screw member S, controls the rotation-driving unit 2 to rotate the rotating body 1 to a second rotation direction R2 by a second predetermined angle θ2, which is smaller than the first predetermined angle θ1. In the present embodiment, the second predetermined angle θ2 is set to a value that corresponds to an angle range in the rotational direction R in which the fitting part 1a is guided in the rotational direction R by the chamfered portions 1d of the rotating body 1 so as to fit to the fitted part Sa. The angle range depends on an inclination angle of the chamfered portions 1d of the rotating body 1 with respect to the second direction Y. Also, this angle range depends also on the dimension of a range in the second direction Y (axial direction) in which the chamfered portions 1d are formed or on the shape of the chamfered portions 1d themselves. The second predetermined angle θ2 can be set to 5°, for example. Note that the second rotation direction R2 is the rotational direction of the rotating body 1 that is opposite the first rotation direction R1.

In the present embodiment, if, in the third control, the control unit 5 determines based on the state of the rotating body 1 detected by the first detection unit 6 that a shift in phase between the fitted part Sa and the fitting part 1a is not greater than an angle threshold TH, which is set to a value equal to or smaller than the second predetermined angle θ2, the control unit 5 advances to the fourth control. In the present example, in the third control, the control unit 5 determines that a shift in phase between the fitted part Sa and the fitting part 1a is not greater than the angle threshold TH if the rotation torque T of the rotating body 1 is greater than a first threshold TH1, or if the moving amount M of the rotating body 1 to the first axial side Y1 is greater than a second threshold TH2.

In the example shown in FIG. 7, after the start of the third control, with the rotation of the rotating body 1 to the first rotation direction R1, the rotating body 1 is slightly moved to the first axial side Y1 so that the angular portions Sb of the screw member S relatively move along the chamfered portions 1d of the rotating body 1 (see the figures (a) and (b) in FIG. 7). Also, when the rotating body 1 is further rotated to the first rotation direction R1, the side surfaces 1b of the fitting part 1a of the rotating body 1 abut against the side surfaces of the fitted part Sa of the screw member S from the second rotation direction R2 (see the figure (c) in FIG. 7). As a result, the fitting surfaces (side surface 1b of the fitting part 1a and the side surface of the fitted part Sa) between the fitted part Sa of the screw member S and the fitting part 1a of the rotating body 1 are brought into contact with each other with a high pressure, preventing the rotating body 1 from moving to the first axial side Y1. This further prevents the rotating body 1 from rotating to the first rotation direction R1, and thus the rotation torque T of the rotating body 1 increases. Also, if the rotation torque T of the rotating body 1 is greater than the first threshold TH1, the rotating body 1 is rotated to the second rotation direction R2 so that the fitting surfaces between the fitted part Sa of the screw member S and the fitting part 1a of the rotating body 1 are separated from each other in the rotational direction R. As a result, the rotating body 1 is moved to the first axial side Y1, and the fitted part Sa of the screw member S is fitted to the fitting part 1a of the rotating body 1 (see the figure (d) in FIG. 7).

In the present embodiment, the control unit 5 performs, after the fourth control, a fifth control, a sixth control, and a seventh control, in the stated order.

Figure 8:
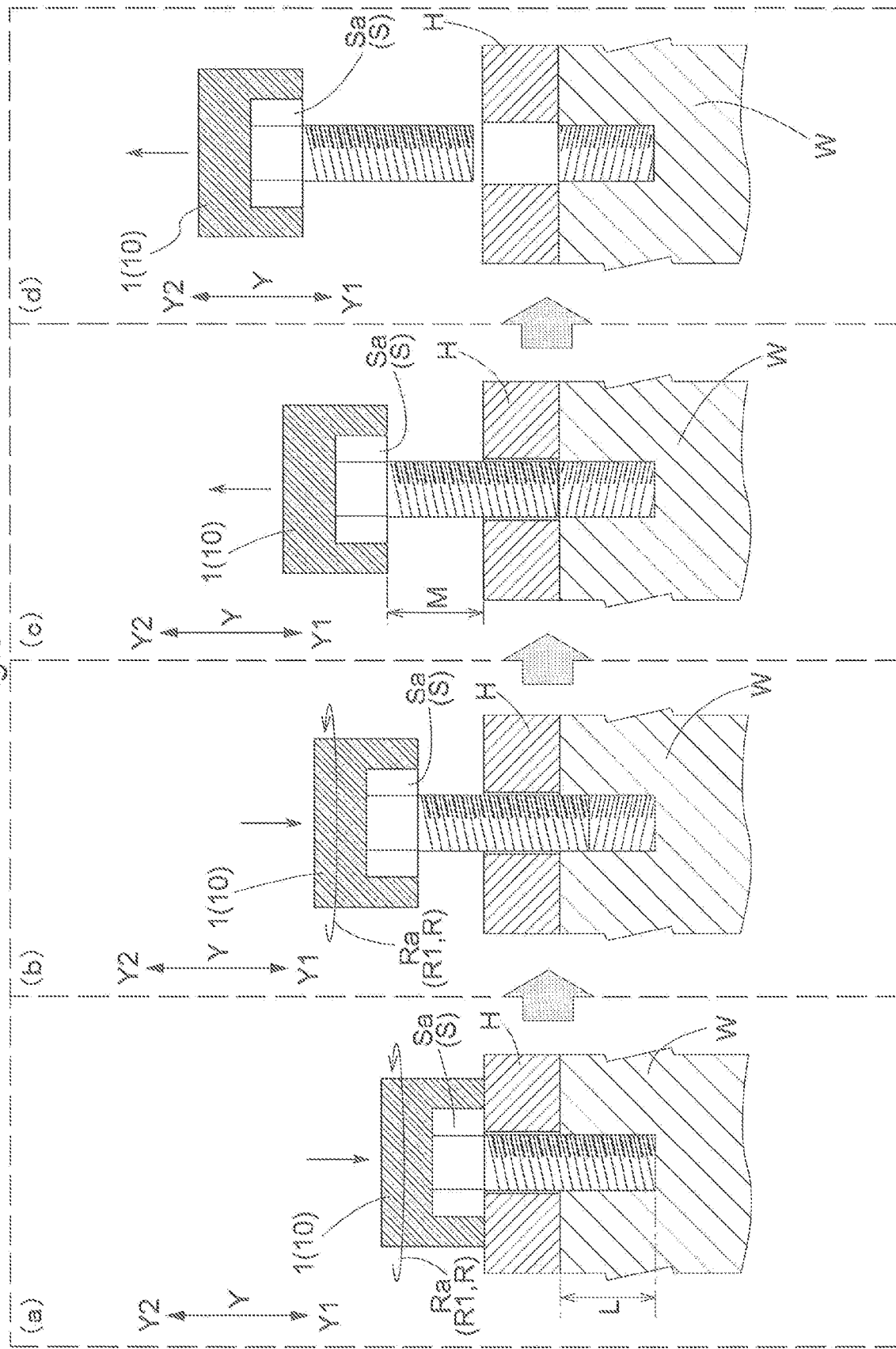
FIG. 8 illustrates examples of a fifth control and a sixth control.

As shown in figures (a) and (b) in FIG. 8, in the fifth control, the control unit 5, while maintaining the state in which the rotating body 1 is subjected to a force to the first axial side Y1 by the movement unit 3, controls the rotation-driving unit 2 to rotate the screw member S to a loosening side Ra via the rotating body 1. Here, the loosening side Ra is a side of the rotating body 1 in the rotational direction on which the screw member S is loosened from the screwing target W. Note that either of the first rotation direction R1 and the second rotation direction R2 may serve as the loosening side Ra. In the shown example, the first rotation direction R1 serves as the loosening side Ra.

As shown in figures (c) and (d) in FIG. 8, in the sixth control, the control unit 5 controls the movement unit 3 to move the rotating body 1 to the second axial side Y2. The sixth control is performed when, in the fifth control, the moving amount M of the rotating body 1 to the second axial side Y2 is equal to an amount that corresponds to a screwing length L of the screw member S with respect to the screwing target W at the start of the fifth control.

In the seventh control, the control unit 5 controls the movement unit 3 so that after removal of the screw member S from the screwing target W, the screw member S is held by the holding unit 4 (see the upper nut runner 10 in FIG. 3). The control unit 5 determines that the removal of the screw member S from the screwing target W is complete if, in the seventh control, it is detected by the second detection unit 7 that the screw member S is held by the holding unit 4.

Figure 9:
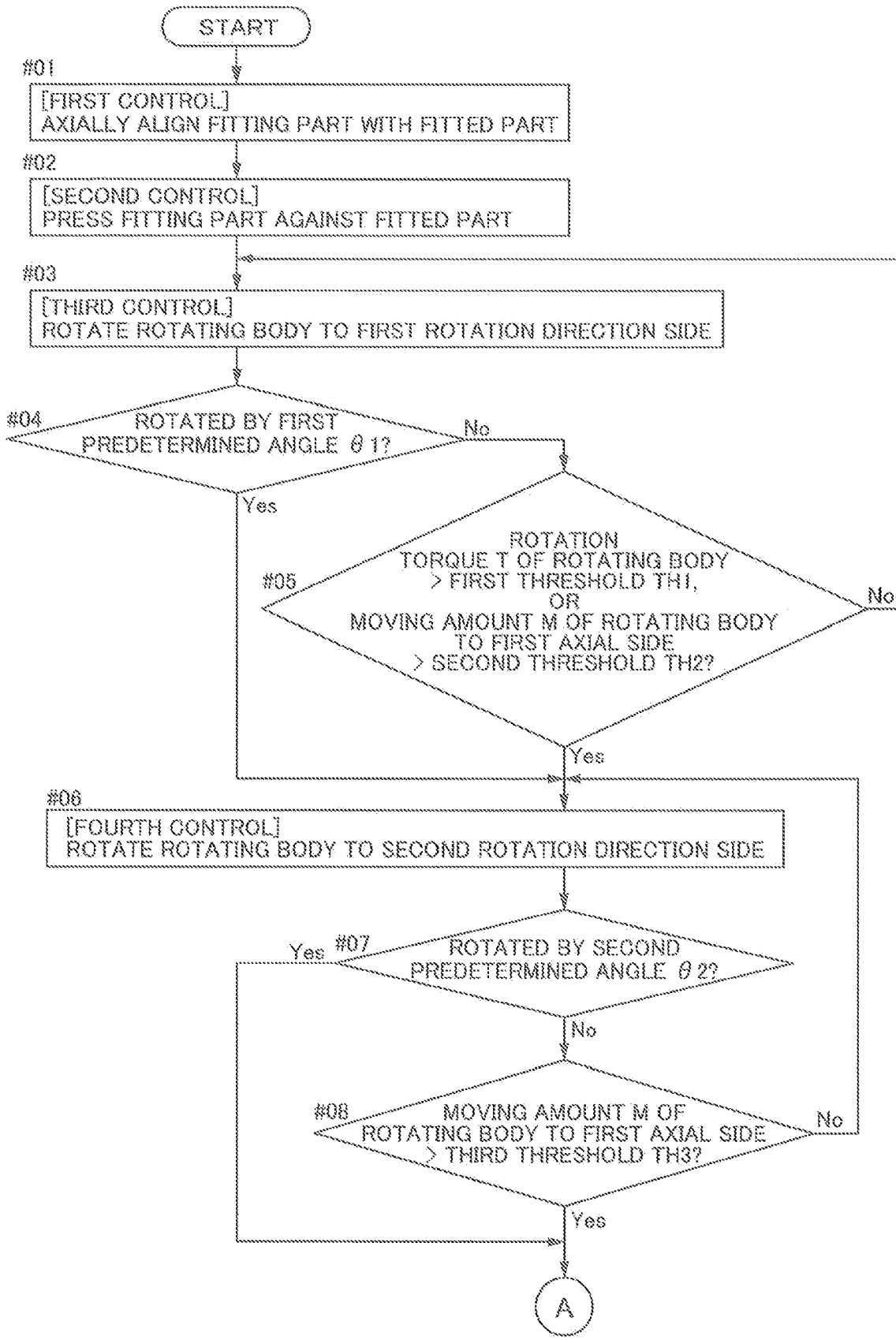
FIG. 9 is a flowchart illustrating an example of control performed when the screw member is removed from the screwing target.

The following will describe control of the control unit 5 when the screw member S is removed from the screwing target W, with reference to FIGS. 9 and 10. FIGS. 9 and 10 are flowcharts showing an example of control performed by the control unit 5 when the screw member S is removed from the screwing target W. Note that the control of the control unit 5 shown in FIGS. 9 and 10 is assumed to be started in a state in which the screwing target W is supported by the jig J.

First, as shown in FIG. 9, as the first control, the control unit 5 controls the movement unit 3 so that the fitting part 1a of the rotating body 1 is axially aligned with the fitted part Sa of the screw member S (step #01). Step #01 corresponds to a "first step".

Then, as the second control, the control unit 5 controls, while maintaining the state in which the fitting part 1a of the rotating body 1 is axially aligned with the fitted part Sa of the screw member S, the movement unit 3 to press the fitting part 1a against the fitted part Sa (step #02). Step #02 corresponds to a "second step".

Then, as the third control, the control unit 5, while maintaining the state in which the fitting part 1a of the rotating body 1 is pressed against the fitted part Sa of the screw member S, controls the rotation-driving unit 2 to rotate the rotating body 1 to the first rotation direction R1 (step #03). Then, the control unit 5 determines whether or not the rotating body 1 has been rotated by the first predetermined angle θ1 after the start of the rotation in the third control (step #04).

If it is determined that the rotating body 1 has not been rotated by the first predetermined angle θ1 (No in step #04), the control unit 5 determines whether or not it is satisfied that the rotation torque T of the rotating body 1 is greater than the first threshold TH1, or that the moving amount M of the rotating body 1 to the first axial side Y1 is greater than the second threshold TH2 (step #05).

If it is determined that the rotation torque T of the rotating body 1 is greater than the first threshold TH1, or that the moving amount M of the rotating body 1 to the first axial side Y1 after the rotating body 1 has started to rotate in the third control is greater than the second threshold TH2 (Yes in step #05), the control unit 5, while maintaining the state in which the fitting part 1a of the rotating body 1 is pressed against the fitted part Sa of the screw member S, controls the rotation-driving unit 2 to rotate the rotating body 1 to the second rotation direction R2 as the fourth control (step #06). On the other hand, if it is determined that the rotation torque T of the rotating body 1 is not greater than the first threshold TH1, and the moving amount M of the rotating body 1 to the first axial side Y1 after the rotating body 1 has started to rotate in the third control is not greater than the second threshold TH2 (No in step #05), the control unit 5 returns to the above-described step #03.

Also, if it is determined in the above-described step #04 that the rotating body 1 is rotated by the first predetermined angle θ1 (Yes in step #04), the control unit 5 performs the above-described step #06.

The above-described steps #03, #04, and #05 correspond to a "third step". Also, the above-described step #05 corresponds to a "first detection step".

After the above-described step #06, the control unit 5 determines whether or not the rotating body 1 has been rotated by the second predetermined angle θ2 after the start of the rotation in the fourth control (step #07).

If it is determined that the rotating body 1 has not been rotated by the second predetermined angle θ2 (No in step #07), the control unit 5 determines whether or not the moving amount M of the rotating body 1 to the first axial side Y1 is greater than a third threshold TH3 (step #08).

If it is determined that the moving amount M of the rotating body 1 to the first axial side Y1 after the rotating body 1 has started to rotate in the fourth control is not greater than the third threshold TH3 (No in step #08), the control unit 5 returns to the above-described step #06.

On the other hand, if it is determined that the moving amount M of the rotating body 1 to the first axial side Y1 after the rotating body 1 has started to rotate in the fourth control is greater than the third threshold TH3 (Yes in step #08), the control unit 5 determines that the fitted part Sa of the screw member S has been fitted to the fitting part 1a of the rotating body 1. Also, as shown in FIG. 10, as the fifth control, the control unit 5, while maintaining the state in which the rotating body 1 is subjected to a force to the first axial side Y1 by the movement unit 3, controls the rotation-driving unit 2 to rotate the screw member S to the loosening side Ra via the rotating body 1 (step #09).

Also, if it is determined in the above-described step #07 that the rotating body 1 has been rotated by the second predetermined angle θ2 (Yes in step #07), the control unit 5 performs the above-described step #09.

The above-described steps #06, #07, and #08 correspond to a "fourth step". Also, the above-described step #09 corresponds to a "fifth step".

After the above-described step #09, the control unit 5 determines whether or not the moving amount M of the rotating body 1 to the second axial side Y2 is equal to an amount that corresponds to the screwing length L of the screw member S with respect to the screwing target W at the start of the fifth control (step #10).

If it is determined that moving amount M of the rotating body 1 to the second axial side Y2 is not equal to the amount that corresponds to the screwing length L of the screw member S with respect to the screwing target W at the start of the fifth control (No in step #10), the control unit 5 returns to the above-described step #09.

On the other hand, if it is determined that moving amount M of the rotating body 1 to the second axial side Y2 is equal to the amount that corresponds to the screwing length L of the screw member S with respect to the screwing target W at the start of the fifth control (Yes in step #10), as the sixth control, the control unit 5 controls the movement unit 3 to move the rotating body 1 to the second axial side Y2 (step #11).

The above-described steps #10 and #11 correspond to a "sixth step".

Then, the control unit 5 controls, as the seventh control, the movement unit 3 so that the screw member S removed from the screwing target W is held by the holding unit 4 (step #12). Then, the control unit 5 determines whether or not the second detection unit 7 has detected that the screw member S is held by the holding unit 4 (step #13).

If it is determined that the second detection unit 7 has detected that the screw member S is held by the holding unit 4 (Yes in step #13), the control unit 5 determines that the removal of the screw member S from the screwing target W is complete (step #14), and ends the control.

On the other hand, if it is determined that the second detection unit 7 has not detected that the screw member S is held by the holding unit 4 (No in step #13), the control unit 5 determines that an error has occurred (step #15), and stops, for example, the operation of the screw member tightening and loosening apparatus 100.

The above-described steps #12, #13, #14, and #15 correspond to a "seventh step". Also, the above-described step #13 corresponds to a "second detection step".

Other Embodiments (1) In the above-described embodiment, a configuration is exemplified in which the screw member S is a hexagon bolt with a hexagonal columnar head serving as the fitted part Sa, and the rotating body 1 is a socket having a hexagonal columnar recess serving as the fitting part 1a. However, the present invention is not limited to this configuration, and a configuration is also possible in which, for example, the screw member S is a hexagon socket bolt having a hexagonal columnar recess serving as the fitted part Sa, and the rotating body 1 is a hexagonal columnar bit serving as the fitting part 1a.

(2) In the above-described embodiment, a configuration is exemplified in which if, in the third control, the rotation torque T of the rotating body 1 is greater than the first threshold TH1, or the moving amount M of the rotating body 1 to the first axial side Y1 is greater than the second threshold TH2, the control unit 5 determines that a shift in phase between the fitted part Sa and the fitting part 1a is not greater than the angle threshold TH, and advances to the fourth control. However, the present invention is not limited to this configuration, and a configuration is also possible in which, for example, instead of determining a shift in phase between the fitted part Sa and the fitting part 1a in the third control, the rotating body 1 is rotated to the first rotation direction R1 by the first predetermined angle θ1, and then the control is advanced to the fourth control.

(3) In the above-described embodiment, a configuration is exemplified in which if it is determined that the moving amount M of the rotating body 1 to the first axial side Y1 is greater than the third threshold TH3 after the rotating body 1 has started to rotate in the fourth control, the control unit 5 determines that the fitted part Sa of the screw member S is fitted to the fitting part 1a of the rotating body 1. However, the present invention is not limited to this configuration, and a configuration is also possible in which, for example, instead of determining the moving amount M of the rotating body 1 to the first axial side Y1 in the fourth control, the control unit 5 determines that the fitted part Sa of the screw member S is fitted to the fitting part 1a of the rotating body 1 upon rotation of the rotating body 1 to the second rotation direction R2 by the second predetermined angle θ2.

(4) In the above-described embodiment, a configuration is exemplified in which the fitting part 1a has the shape of a polygonal tube with a plurality of side surfaces 1b surrounding the axis of the fitting part 1a. However, the present invention is not limited to this configuration, and a configuration is also possible in which the fitting part 1a includes a tubular side surface 1b that is curved when viewed in a direction along the axis of the fitting part 1a.

(5) In the specific example of the above-described embodiment, a configuration is exemplified in which the chamfered portions 1d are continuously formed over the entire region, in the rotational direction R, of the end of the fitting part 1a on the first axial side Y1. However, the present invention is not limited to this configuration, and a configuration is also possible in which, for example, the chamfered portions 1d inclined with respect to the second direction Y are formed only in the boundary portions 1c between adjacent side surfaces 1b of the plurality of side surfaces 1b at an end of the fitting part 1a on the first axial side Y1. A configuration is also possible in which the rotating body 1 does not have any chamfered portion 1d. Also, the example shown in FIG. 4 or the like has a configuration in which the cross section of each chamfered portion 1d taken along the second direction Y (axial direction) is arc-shaped protruding toward the axis of the fitting part 1a, but the present invention is not limited to this configuration. For example, a configuration is also possible in which the cross section of each chamfered portion 1d taken along the second direction Y (axial direction) is linear, or arc-shaped recessed outward in the radial direction of the rotating body 1.

(6) In the above-described embodiment, a configuration is exemplified in which if the moving amount M of the rotating body 1 to the second axial side Y2 in the fifth control is equal to an amount that corresponds to a screwing length L of the screw member S with respect to the screwing target W at the start of the fifth control, the control unit 5 controls, as the sixth control, the movement unit 3 to move the rotating body 1 to the second axial side Y2. However, the present invention is not limited to this configuration, and a configuration is also possible in which the control unit 5 performs the sixth control if, for example, the moving amount M of the rotating body 1 to the second axial side Y2 in the fifth control is greater than the screwing length L of the screw member S with respect to the screwing target W at the start of the fifth control.

(7) In the above-described embodiment, a configuration is exemplified in which the first detection unit 6 for detecting the state of the rotating body 1, and the second detection unit 7 for detecting whether or not the screw member S is held by the holding unit 4 are provided. However, the present invention is not limited to this configuration, and a configuration is also possible in which at least one of the first detection unit 6 and the second detection unit 7 is not provided.

(8) It should be noted that the configurations disclosed in the above-described embodiments can also be applied in combination with configurations disclosed in other embodiments so long as no contradiction is incurred. With respect to other configurations, the embodiments disclosed in the present specification are mere examples. Therefore, various modifications are possible as appropriate without departing from the spirits of the present disclosure.

Overview of the Above-Described Embodiments

The following will describe overviews of the above-described screw member tightening and loosening apparatus.

A screw member tightening and loosening apparatus includes:
  a rotating body that has a fitting part configured to fit to a fitted part of a screw member, and is supported so as to be rotatable about an axis of the fitting part;
  a rotation-driving unit configured to rotate the rotating body;
  a movement unit configured to move the rotating body; and
  a control unit configured to control operations of the rotation-driving unit and the movement unit,
  wherein letting one side in a rotational direction of rotation of the rotating body caused by the rotation-driving unit be a first rotation direction, and the other side be a second rotation direction,
  the control unit is configured to perform:
    a first control of controlling the movement unit so that the fitted part and the fitting part are axially aligned with each other;
    a second control of, while maintaining a state in which the fitted part and the fitting part are axially aligned with each other, controlling the movement unit to press the fitting part against the fitted part;
    a third control of, while maintaining a state in which the fitting part is pressed against the fitted part, controlling the rotation-driving unit to rotate the rotating body to the first rotation direction by a first predetermined angle; and a fourth control of, while maintaining the state in which the fitting part is pressed against the fitted part, controlling the rotation-driving unit to rotate the rotating body to the second rotation direction by a second predetermined angle, which is smaller than the first predetermined angle, the fourth control performed after the third control, the fitting part is shaped such that a predetermined shape repeatedly appears at every predetermined angle in the rotational direction, and the first predetermined angle is set to an angle that corresponds to the predetermined angle.

According to this configuration, after the first control of controlling the movement unit so that the fitted part of the screw member and the fitting part of the rotating body are axially aligned with each other, the second control of controlling the movement unit to press the fitting part against the fitted part, and the third control of controlling the rotation-driving unit to rotate the rotating body to the first rotation direction by the first predetermined angle, the fourth control of, while maintaining the state in which the fitting part is pressed against the fitted part, controlling the rotation-driving unit to rotate the rotating body to the second rotation direction by the second predetermined angle is performed. With this, even if, during the third control, the fitting surfaces of the fitted part of the screw member and the fitting part of the rotating body are in contact with each other with a high pressure, it is possible, in the fourth control, to rotate the rotating body so that these fitting surfaces are separated from each other, and move the rotating body toward the screw member. As a result, it is possible to appropriately fit the fitting part of the rotating body to the fitted part of the screw member.

Here, preferably, the screw member tightening and loosening apparatus further includes a first detection unit configured to detect a state of the rotating body, wherein the fitting part is configured to fit to the fitted part when a phase of the predetermined shape of the fitting part repeatedly appearing at every predetermined angle matches a phase of a corresponding shape of the fitted part, and in the third control, if it is determined based on the state of the rotating body detected by the first detection unit that a shift in phase between the fitted part and the fitting part is not greater than an angle threshold set to a value equal to or smaller than the second predetermined angle, the control unit advances to the fourth control.

According to this configuration, if it is determined based on the state of the rotating body detected by the first detection unit that a shift in phase between the fitted part and the fitting part is reduced, the fourth control is started. Accordingly, it is possible to start the fourth control at an appropriate timing. Therefore, it is possible to fit the fitting part of the rotating body to the fitted part of the screw member more appropriately.

Here, in the configuration with the first detection unit, preferably, letting a direction along the axis of the fitting part be an axial direction, and a side in the axial direction to which the fitting part approaches the fitted part be a first axial side, the first detection unit is configured to detect at least one of a rotation torque of the rotating body and a moving amount of the rotating body in the axial direction, and in the third control, the control unit determines that a shift in phase between the fitted part and the fitting part is not greater than the angle threshold if the rotation torque of the rotating body is greater than a first threshold, or if the moving amount of the rotating body to the first axial side is greater than a second threshold.

According to this configuration, if, in the third control, the fitting surfaces of the fitted part of the screw member and the fitting part of the rotating body are in contact with each other with a high pressure, and the rotation torque of the rotating body is increased to a value greater than the first threshold, it is determined that a shift in phase between the fitted part and the fitting part is reduced, and the fourth control is started. Alternatively, if, in the third control, the rotating body has started moving toward the screw member, and the moving amount of the rotating body is increased to a value greater than the second threshold, it is determined that a shift in phase between the fitted part and the fitting part is reduced, and the fourth control is started. Accordingly, it is possible to start the fourth control at a more appropriate timing. Therefore, it is possible to fit the fitting part of the rotating body to the fitted part of the screw member more appropriately.

Also, preferably, letting a direction along the axis of the fitting part be an axial direction, and a side in the axial direction to which the fitting part approaches the fitted part be a first axial side, the fitting part has the shape of a polygonal tube with a plurality of side surfaces surrounding the axis of the fitting part, a boundary portion between adjacent side surfaces of the plurality of side surfaces has, at an end on the first axial side, a chamfered portion that is inclined with respect to the axial direction, and the second predetermined angle is set to a value that corresponds to an angle range in the rotational direction in which the fitting part is guided in the rotational direction by the chamfered portion so as to fit to the fitted part.

According to this configuration, in the third control and the fourth control, the fitted part can be guided by the chamfered portion formed in the fitting part so that a shift in phase between the fitted part and the fitting part is reduced.

Also, the second predetermined angle is set to a value that corresponds to an angle range in the rotational direction in which the fitting part is guided by the chamfered portion in the rotational direction so as to fit to the fitted part. Accordingly, in the fourth control, it is possible to rotate the rotating body to the second rotation direction in the range in which the fitted part is guided by the chamfered portion of the fitting part. Accordingly, it is easy to fit the fitting part of the rotating body to the fitted part of the screw member.

Also, preferably, letting a direction along the axis of the fitting part be an axial direction, a side in the axial direction to which the fitting part approaches the fitted part be a first axial side, a side in the axial direction to which the fitting part is separated from the fitted part be a second axial side, and a side in the rotational direction to which the screw member is loosened from a screwing target be a loosening side, the control unit is configured to perform:

a fifth control of, while maintaining a state in which the rotating body is subjected to a force to the first axial side by the movement unit, controlling the rotation-driving unit to rotate the screw member to the loosening side via the rotating body, the fifth control performed after the fourth control; and a sixth control of controlling the movement unit to move the rotating body to the second axial side if, in the fifth control, the moving amount of the rotating body to the second axial side is equal to an amount that corresponds to a screwing length of the screw member with respect to the screwing target at the start of the fifth control.

According to this configuration, in the fifth control of, while maintaining the state in which the rotating body is subjected to a force to the first axial side, rotating the screw member to the loosening side, the sixth control of moving the rotating body to the second axial side is started at a point in time when the screwing of the screw member to the screwing target is undone. With this, it is possible to prevent the state in which the screw member is pressed against the screwing target from continuing after the screwing of the screw member to the screwing target has been undone.

Also, preferably, the screw member tightening and loosening apparatus further includes:

a holding unit configured to hold the screw member; and a second detection unit configured to detect whether or not the screw member is held by the holding unit, wherein the control unit is configured to perform a seventh control of controlling the movement unit so that the screw member is held by the holding unit after the screw member has been removed from the screwing target, and in the seventh control, if it is detected by the second detection unit that the screw member is held by the holding unit, the control unit determines that the removal of the screw member from the screwing target is complete.

According to this configuration, the screw member is held by the holding unit after having been removed from the screwing target, and thus it is easy to collect the screw member.

Also, according to this configuration, if the second detection unit has detected that the screw member is held by the holding unit, it is determined that the removal of the screw member from the screwing target is complete. Accordingly, if it is determined that the screw member is not held by the holding unit, it is possible to perform, for example, processing of halting the operation of the screw member tightening and loosening apparatus, thus making it possible to avoid an unanticipated situation.

A screw member tightening and loosening method is for tightening and loosening a screw member using a rotating body that has a fitting part configured to fit to a fitted part of the screw member, and is supported so as to be rotatable about an axis of the fitting part, the fitting part being shaped such that a predetermined shape repeatedly appears at every predetermined angle in a rotational direction of the rotating body, and letting one side in the rotational direction be a first rotation direction, and the other side be a second rotation direction, the method including:

a first step of moving the rotating body so that the fitted part and the fitting part are axially aligned with each other;

a second step of, while maintaining a state in which the fitted part and the fitting part are axially aligned with each other, moving the rotating body to press the fitting part against the fitted part;

a third step of, while maintaining a state in which the fitting part is pressed against the fitted part, rotating the rotating body to the first rotation direction by a first predetermined angle that is set to an angle corresponding to the predetermined angle; and a fourth step of, while maintaining the state in which the fitting part is pressed against the fitted part, rotating the rotating body to the second rotation direction by a second predetermined angle, which is smaller than the first predetermined angle, the fourth step performed after the third step.

According to this configuration, after the first step of moving the rotating body so that the fitted part of the screw member and the fitting part of the rotating body are axially aligned with each other, the second step of moving the rotating body to press the fitting part against the fitted part, and the third step of rotating the rotating body to the first rotation direction by the first predetermined angle, the fourth step of, while maintaining the state in which the fitting part is pressed against the fitted part, rotating the rotating body to the second rotation direction by the second predetermined angle is performed. With this, even if the fitting surfaces of the fitted part of the screw member and the fitting part of the rotating body are in contact with each other with a high pressure during the third step, it is possible, in the fourth step, to rotate the rotating body so that these fitting surfaces are separated from each other, and move the rotating body toward the screw member. As a result, it is possible to appropriately fit the fitting part of the rotating body to the fitted part of the screw member.

Here, preferably, the fitting part is configured to fit to the fitted part when a phase of the predetermined shape of the fitting part repeatedly appearing at every predetermined angle matches a phase of a corresponding shape of the fitted part, the third step includes a first detection step of detecting a state of the rotating body, and in the third step, if it is determined based on the state of the rotating body detected in the first detection step that a shift in phase between the fitted part and the fitting part is not greater than an angle threshold set to a value equal to or smaller than the second predetermined angle, the method advances to the fourth step.

According to this configuration, if, in the third step, it is determined based on the state of the rotating body detected in the first detection step that a shift in phase between the fitted part and the fitting part is reduced, the fourth step is started. Accordingly, it is possible to start the fourth step at an appropriate timing. Accordingly, it is possible to fit the fitting part of the rotating body and the fitted part of the screw member more appropriately.

Also, preferably, letting a direction along the axis of the fitting part be an axial direction, and a side in the axial direction to which the fitting part approaches the fitted part be a first axial side, in the first detection step, at least one of a rotation torque of the rotating body, and a moving amount of the rotating body in the axial direction is detected, and in the third step, it is determined that a shift in phase between the fitted part and the fitting part is not greater than the angle threshold if the rotation torque of the rotating body is greater than a first threshold, or if a moving amount of the rotating body to the first axial side is greater than a second threshold.

According to this configuration, if, in the third step, the fitting surfaces of the fitted part of the screw member and the fitting part of the rotating body are in contact with each other with a high pressure, and the rotation torque of the rotating body is increased to a value greater than the first threshold, it is determined that a shift in phase between the fitted part and the fitting part is reduced, and the fourth step is started. Alternatively, if, in the third step, the rotating body has started moving toward the screw member, and the moving amount of the rotating body is increased to a value greater than the second threshold, it is determined that a shift in phase between the fitted part and the fitting part is reduced, and the fourth step is started. Accordingly, it is possible to start the fourth step at a more appropriate timing. Therefore, it is possible to fit the fitting part of the rotating body to the fitted part of the screw member more appropriately.

Also, preferably, letting a direction along the axis of the fitting part be an axial direction, a side in the axial direction to which the fitting part approaches the fitted part be a first axial side, a side in the axial direction to which the fitting part is separated from the fitted part be a second axial side, and a side in the rotational direction to which the screw member is loosened from a screwing target be a loosening side, the method further includes:
- a fifth step of, while maintaining a state in which the rotating body is subjected to a force to the first axial side, rotating the rotating body so that the screw member is rotated to the loosening side, the fifth step performed after the fourth step; and
- a sixth step of moving the rotating body to the second axial side, if, in the fifth step, the moving amount of the rotating body to the second axial side is equal to an amount that corresponds to a screwing length of the screw member with respect to the screwing target at the start of the fifth step.

According to this configuration, the sixth step of moving the rotating body to the second axial side is started at a point in time when the screwing of the screw member to the screwing target is undone in the fifth step of rotating the screw member to the loosening side while maintaining the state in which the rotating body is subjected to a force to the first axial side. With this, it is possible to prevent the state in which the screw member is pressed against the screwing target from continuing after the screwing of the screw member to the screwing target has been undone.

Also, preferably, the screw member tightening and loosening method further includes:
- a seventh step of, after the screw member has been removed from the screwing target, moving the rotating body so that the screw member is held by the holding unit,
- wherein the seventh step includes a second detection step of detecting whether or not the screw member is held by the holding unit, and
- in the seventh step, if it is determined in the second detection step that the screw member is held by the holding unit, it is determined that the removal of the screw member from the screwing target is complete.

According to this configuration, the screw member is held by the holding unit after having been removed from the screwing target, and thus it is easy to collect the screw member.

Also, according to this configuration, if it is detected in the second detection step that the screw member is held by the holding unit, it is determined that the removal of the screw member from the screwing target is complete. Accordingly, if it is determined that the screw member is not held by the holding unit, it is possible to perform, for example, processing of halting the operation of the screw member tightening and loosening apparatus, thus making it possible to avoid an unanticipated situation.

INDUSTRIAL APPLICABILITY

The technique according to the present disclosure is applicable to a screw member tightening and loosening apparatus including a rotating body having a fitting part configured to fit to a fitted part of a screw member, a rotation-driving unit configured to rotate the rotating body, and a movement unit configured to move the rotating body.

DESCRIPTION OF REFERENCE SIGNS

100: Screw member tightening and loosening apparatus
1: Rotating body
1a: Fitting part
2: Rotation-driving unit
3: Movement unit
5: Control unit
S: Screw member
Sa: Fitted part
θ1: First predetermined angle
θ2: Second predetermined angle
R: Rotational direction
R1: First rotation direction
R2: Second rotation direction

The invention claimed is:

1. A screw member tightening and loosening apparatus comprising:
   a rotating body comprising a fitting part configured to fit to a fitted part of a screw member, and is supported so as to be rotatable about an axis of the fitting part;
   a rotation-driving unit configured to rotate the rotating body;
   a movement unit configured to move the rotating body; and
   a control unit configured to control operations of the rotation-driving unit and the movement unit, and
   wherein:
   one rotational direction of the rotating body caused by the rotation-driving unit is defined as a first rotation direction, and an opposite rotational direction is defined as a second rotation direction,
   the control unit is configured to perform:
     a first control configured to control the movement unit so that the fitted part and the fitting part are axially aligned with each other;
     a second control configured to control the movement unit to press the fitting part against the fitted part while maintaining a state in which the fitted part and the fitting part are axially aligned with each other;
     a third control configured to control the rotation-driving unit to rotate the rotating body in the first rotation direction by a first predetermined angle while maintaining a state in which the fitting part is pressed against the fitted part; and
     a fourth control configured to control the rotation-driving unit to rotate the rotating body in the second direction by a second predetermined angle while maintaining the state in which the fitting part is pressed against the fitted part
   the second predetermined angle is smaller than the first predetermined angle, the fourth control performed after the third control,
   the fitting part is shaped such that it repeatedly forms a predetermined shape about the rotational direction, and the first predetermined angle corresponds to a predetermined angle.

2. The screw member tightening and loosening apparatus according to claim 1, further comprising:
   a first detection unit configured to detect a state of the rotating body, and
   wherein the fitting part is configured to fit to the fitted part when a phase of the predetermined shape of the fitting part repeatedly appearing at every predetermined angle matches a phase of a corresponding shape of the fitted part, and
   wherein in the third control, if it is determined based on the state of the rotating body detected by the first detection unit that a shift in phase between the fitted part and the fitting part is not greater than an angle threshold set to a value equal to or smaller than the second predetermined angle, the control unit advances to the fourth control.

3. The screw member tightening and loosening apparatus according to claim 2, wherein:
   a direction along the axis of the fitting part is an axial direction, and a side in the axial direction to which the fitting part approaches the fitted part is a first axial side,
   the first detection unit is configured to detect at least one of a rotation torque of the rotating body and a moving amount of the rotating body in the axial direction, and
   in the third control, the control unit determines that a shift in phase between the fitted part and the fitting part is not greater than the angle threshold if the rotation torque of the rotating body is greater than a first threshold, or if the moving amount of the rotating body to the first axial side is greater than a second threshold.

4. The screw member tightening and loosening apparatus according to claim 1, wherein:
   a direction along the axis of the fitting part is an axial direction, and a side in the axial direction to which the fitting part approaches the fitted part is a first axial side,
   the fitting part has the shape of a polygonal tube with a plurality of side surfaces surrounding the axis of the fitting part,
   a boundary portion between adjacent side surfaces of the plurality of side surfaces has, at an end on the first axial side, a chamfered portion that is inclined with respect to the axial direction, and the second predetermined angle is set to a value that corresponds to an angle range in the rotational direction in which the fitting part is guided in the rotational direction by the chamfered portion so as to fit to the fitted part.

5. The screw member tightening and loosening apparatus according to claim 1, wherein:
   a direction along the axis of the fitting part is an axial direction, and a side in the axial direction to which the fitting part approaches the fitted part is a first axial side, a side in the axial direction to which the fitting part is separated from the fitted part is a second axial side, and a side in the rotational direction to which the screw member is loosened from a screwing target is a loosening side,
   the control unit is configured to perform:
     a fifth control of, while maintaining a state in which the rotating body is subjected to a force to the first axial side by the movement unit, controlling the rotation-driving unit to rotate the screw member to the loosening side via the rotating body, the fifth control performed after the fourth control; and
     a sixth control of controlling the movement unit to move the rotating body to the second axial side if, in the fifth control, the moving amount of the rotating body to the second axial side is equal to an amount that corresponds to a screwing length of the screw member with respect to the screwing target at the start of the fifth control.

6. The screw member tightening and loosening apparatus according to claim 1, further comprising:
   a holding unit configured to hold the screw member; and
   a second detection unit configured to detect whether or not the screw member is held by the holding unit,
   wherein the control unit is configured to perform a seventh control of controlling the movement unit so that the screw member is held by the holding unit after the screw member has been removed from the screwing target, and
   wherein in the seventh control, if it is detected by the second detection unit that the screw member is held by the holding unit, the control unit determines that the removal of the screw member from the screwing target is complete.

* * * * *